United States Patent
Hokazono et al.

(10) Patent No.: US 6,873,387 B2
(45) Date of Patent: Mar. 29, 2005

(54) ANTIREFLECTION FILM, SHEET POLARIZER AND LIQUID CRYSTAL DISPLAY DEVICE

(75) Inventors: Hirohisa Hokazono, Kanagawa (JP); Ichiro Amimori, Kanagawa (JP); Kazuhiro Nakamura, Kanagawa (JP)

(73) Assignee: Fuji Photo Film Co., Ltd., Ashigara (JP)

( * ) Notice: Subject to any disclaimer, the term of this patent is extended or adjusted under 35 U.S.C. 154(b) by 287 days.

(21) Appl. No.: 09/794,625

(22) Filed: Feb. 28, 2001

(65) Prior Publication Data

US 2001/0050741 A1 Dec. 13, 2001

(30) Foreign Application Priority Data

Feb. 28, 2000 (JP) ...................................... P.2000-051724
Mar. 16, 2000 (JP) ...................................... P.2000-074341

(51) Int. Cl.[7] ........................................... G02F 1/1335
(52) U.S. Cl. ...................... 349/137; 349/62; 359/580; 359/581; 428/1.23; 428/1.52
(58) Field of Search ............................. 349/137, 62, 8, 349/5, 9; 359/580, 581; 428/1.23, 1.52, 421, 327, 447, 448, 451; 313/479

(56) References Cited

U.S. PATENT DOCUMENTS

| | | | |
|---|---|---|---|
| 4,560,240 A | * 12/1985 | Sekimura | 349/137 |
| 4,904,525 A | 2/1990 | Taniguchi et al. | |
| 4,940,602 A | 7/1990 | Taniguchi et al. | |
| 5,139,879 A | * 8/1992 | Aharoni et al. | 428/422 |
| 5,858,526 A | * 1/1999 | Floch et al. | 428/327 |
| 5,886,102 A | * 3/1999 | Sinta et al. | 525/154 |
| 6,040,881 A | * 3/2000 | Koyama | 349/8 |
| 6,129,980 A | * 10/2000 | Tsukada et al. | 428/327 |
| 6,340,404 B1 | 1/2002 | Oka et al. | |
| 6,372,354 B1 | * 4/2002 | Park et al. | 428/447 |

* cited by examiner

Primary Examiner—Robert H. Kim
Assistant Examiner—George Y. Wang
(74) Attorney, Agent, or Firm—Burns, Doane, Swecker & Mathis, LLP

(57) ABSTRACT

An antireflection film is disclosed, comprising a transparent support having thereon a low refractive index layer having a refractive index of 1.35 to 1.49 and containing a hydrolysate of an organosilane or a partial condensate thereof, a compound capable of generating a reaction accelerator under light, and a fluorine-containing polymer. This antireflection film has high antireflection performance and excellent resistance against fouling and scratching and can be produced at a low cost.

18 Claims, 1 Drawing Sheet

Fig. 1

ANTIREFLECTION FILM, SHEET POLARIZER AND LIQUID CRYSTAL DISPLAY DEVICE

FIELD OF THE INVENTION

The present invention relates to an antireflection film, more specifically, the present invention relates to an antireflection film having glare-proofing property, and a sheet polarizer and a liquid display device using the film.

BACKGROUND OF THE INVENTION

The antireflection film is generally disposed on the outermost surface of a display having a reflectance reduced by using an optical interference principle in an image display device such as cathode ray tube display device (CRT), plasma display panel (PDP) and liquid crystal display device (LCD), so as to prevent reflection of external light which causes reduction in the contrast or reflection of an image.

In recent years, the display of an image display device is required to have higher precision, higher luminance and higher color reproducibility and to cope with this, the antireflection film is also demanded to have more improved antireflection performance.

However, in an antireflection film having only a hard coat layer and a low refractive index layer on a transparent support, the low refractive index layer must be designed to have sufficiently low refractive index so as to reduce the reflectance. For example, in the case of an antireflection film having a triacetyl cellulose support and using a dipentaerythritol hexaacrylate UV curable film as the hard coat layer, the refractive index must be 1.40 or less for attaining an average reflectance of 1.6% or less in the range from 450 to 650 nm.

The material having a refractive index of 1.40 or less includes, as an inorganic material, fluorine-containing compounds such as magnesium fluoride and calcium fluoride, and as an organic material, fluorine-containing compounds having a large fluorine content. These fluorine-containing compounds lack, however, in the cohesion and therefore, deficient in the scratch resistance as a film disposed on the outermost surface of the display. In order to have sufficiently high scratch resistance, a compound having a refractive index of 1.43 or more is necessary.

JP-A-7-287102 (the term "JP-A" as used herein means an "unexamined published Japanese patent application") describes a technique of increasing the refractive index of the hard coat layer and thereby reducing the reflectance. However, due to large difference in the refractive index between this high refractive index hard coat layer and the support, color irregularity is generated on the film and the dependency of the reflectance on the wavelength greatly fluctuates.

JP-A-7-333404 describes an antiglare antireflection film excellent in the gas barrier property, glare-proofing property and antireflection property, where, however, a silicon oxide film by CVD method is indispensable and therefore, the productivity is inferior to the wet coating method of forming a film by coating a coating solution.

JP-B-6-98703 (the term "JP-B" as used herein means an "examined Japanese patent publication") and JP-A-63-21601 discloses a technique of coating a composition comprising a hydrolysis partial condensate of an alkoxysilane compound on the surface of a plastic substrate and thereby reducing the reflected light. According to this technique described in those patent publications, an inorganic film is obtained by a sol-gel process using a wet coating method. Since the film is an inorganic film, a very high film strength is expected, however, this inorganic film generally exhibits poor adhesive property to many substrates and is disadvantageously liable to cause peeling failure. Furthermore, heating for a long time is indispensable for the curing and therefore, the productivity is low.

SUMMARY OF THE INVENTION

One object of the present invention is to provide an antireflection film having excellent antireflection performance.

Another object of the present invention is to provide an advantageous antireflection film which can be produced simply and inexpensively only by forming an antiglare hard coat layer and a low refractive index layer on a support and which is sufficiently high in the antireflection performance and scratch resistance, favored with antifouling property and reduced in the occurrence of color irregularity.

Still another object of the present invention is to provide a sheet polarizer and a liquid crystal display device, which are sufficiently prevented from reflection of external light and favored with excellent antifouling property and high scratch resistance.

According to the present invention, an antireflection film having the following constructions, and a sheet polarizer and a liquid crystal display device using the film are provided and by these, the above-described objects can be attained.

(1) An antireflection film comprising a transparent support having thereon a low refractive index layer having a refractive index of 1.35 to 1.49 and containing a hydrolysate of an organosilane and/or a partial condensate thereof, a compound capable of generating a reaction accelerator under light, and a fluorine-containing polymer.

(2) The antireflection film as described in (1), wherein an antiglare hard coat layer comprising particles having an average particle size of 1 to 10 $\mu$m is provided between the transparent support and the low refractive index layer, the haze value is from 3 to 20%, and the average reflectance in the range from 450 to 650 nm is 1.8% or less.

(3) The antireflection film as described in (2), wherein when particles having an average particle size of 1 to 10 $\mu$m are removed from the composition for forming the antiglare hard coat layer and a film is formed of the composition, the film has a refractive index of 1.57 to 2.00.

(4) The antireflection film as described in (1), wherein in the low refractive index layer, the compound capable of generating a reaction accelerator under light is a photoacid generator.

(5) The antireflection film as described in (1), wherein in the low refractive index layer, the fluorine-containing polymer is a polymer obtained by polymerizing a fluorine-containing vinyl monomer.

(6) The antireflection film as described in (5), wherein the fluorine-containing polymer has a functional group capable of covalently bonding with the organosilane.

(7) The antireflection film as described in (1), wherein the composition for forming the low refractive index layer contains inorganic fine particles having an average particle size of 0.001 to 0.2 $\mu$m.

(8) The antireflection film as described in (7), wherein the inorganic fine particle contained in the composition for forming the low refractive index layer is silica particle.

(9) The antireflection film as described in (8), wherein the silica particle is treated with a silane coupling agent.

(10) The antireflection film as described in (1), wherein the transparent support is triacetyl cellulose, polyethylene terephthalate or polyethylene naphthalate.

(11) A sheet polarizer comprising a polarizing layer sandwiched by two sheets of protective film, at least one of the two sheets of protective film being an antireflection film comprising a transparent support having thereon a low refractive index layer having a refractive index of 1.35 to 1.49 and containing a hydrolysate of an organosilane and/or a partial condensate thereof, a compound capable of generating a reaction accelerator under light, and a fluorine-containing polymer.

(12) A liquid crystal display device using for the outermost layer of the display, an antireflection film comprising a transparent support having thereon a low refractive index layer having a refractive index of 1.35 to 1.49 and containing a hydrolysate of an organosilane and/or a partial condensate thereof, a compound capable of generating a reaction accelerator under light, and a fluorine-containing polymer, or a low refractive index layer of a sheet polarizer comprising a polarizing layer sandwiched by two sheets of protective film with at least one of the two sheets of protective film being the antireflection film.

(13) The antireflection film as described in (1), wherein the transparent film is a triacetyl cellulose film manufactured by dissolving triacetyl cellulose in a solvent to prepare a triacetyl cellulose dope and casting the triacetyl cellulose dope using any one casting method of single-layer casting, multi-layer co-casting and multi-layer sequential casting.

(14) The antireflection film as described in (13), wherein the triacetyl cellulose dope is a triacetyl cellulose dope prepared by dissolving triacetyl cellulose in a solvent substantially free of dichloromethane using a cooling dissolution or high-temperature dissolution method.

(15) The antireflection film as described in (1), wherein the low refractive index layer has a refractive index of 1.35 to 1.44.

(16) The antireflection film as described in (2), wherein the antiglare hard coat layer comprises particles having an average particle size of 1.5 to 7.0 μm.

(17) The antireflection film as described in (1), wherein the low refractive index layer satisfies the following equation (I):

$$m\lambda/4 \times 0.7 < n_1 d_1 < m\lambda/4 \times 1.3 \tag{I}$$

wherein m is a positive odd number, $n_1$ is a refractive index of the low refractive index layer, $d_1$ is a thickness (nm) of the low refractive index layer and λ is a wavelength of 500 to 550 nm.

(18) The antireflection film as described in (1), wherein the fluorine-containing polymer is selected from the group consisting of fluorine-containing vinyl polymers, fluorine-containing polyethers and fluorine-containing polysiloxanes.

(19) The antireflection film as described in (18), wherein the fluorine-containing polymer is selected from the group consisting of fluorine-containing vinyl polymers.

(20) The antireflection film as described in (1), wherein the compound capable of generating a reaction accelerator under light is selected from the group consisting of a photoacid generator and a photo-base generator.

1 antireflection film
2 transparent support
3 hard coat layer
4 antiglare hard coat layer
5 low refractive index layer
6 particles

DETAILED DESCRIPTION OF THE INVENTION

In the antireflection film of the present invention, the low refractive index layer comprises a hydrolysate of an organosilane described later and/or a partial condensate thereof, that is, a so-called sol-gel component, a compound capable of generating a reaction accelerator under light and a fluorine-containing polymer. The refractive index is from 1.35 to 1.49, preferably from 1.35 to 1.44.

Figure 1:
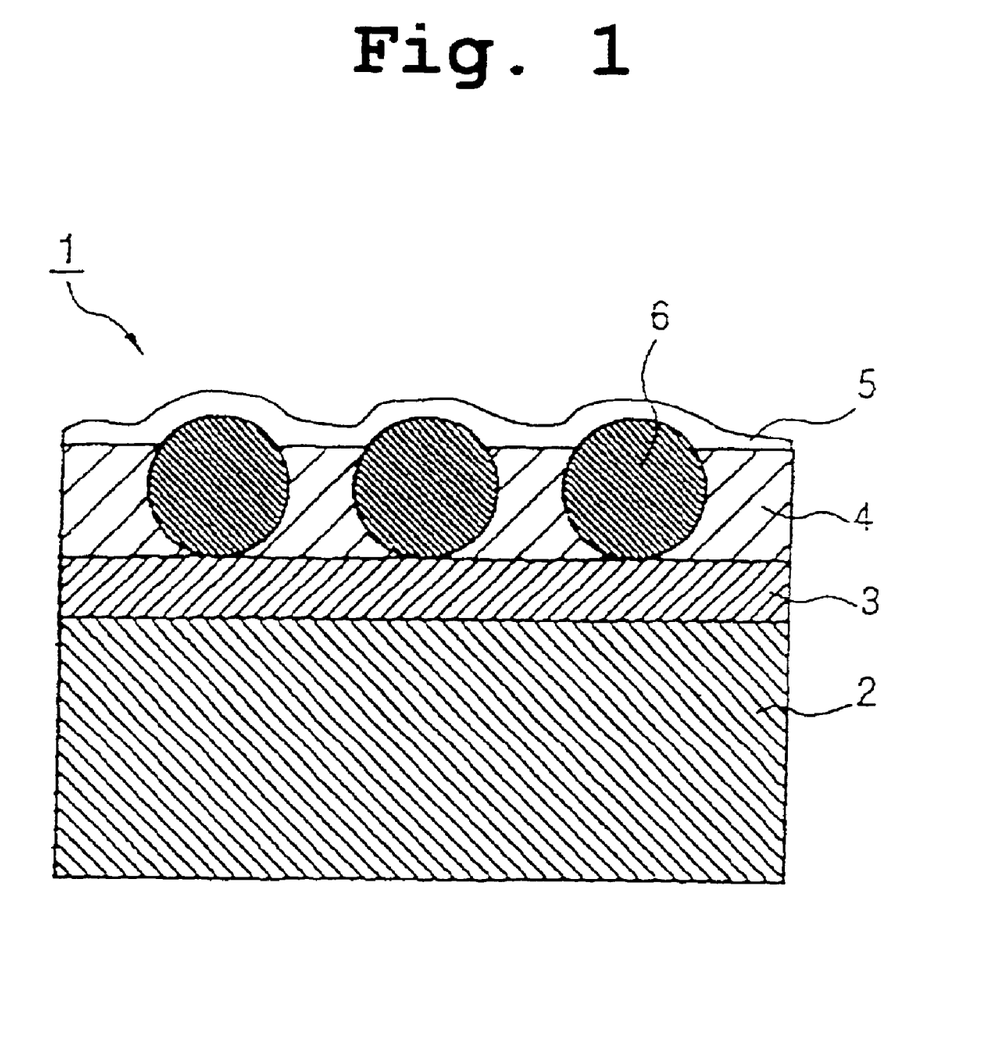
FIG. 1 is a cross-sectional schematic view showing the layer structure of the preferred antireflection film.

One preferred embodiment of the present invention is described below by referring to the drawings.

The embodiment schematically shown in FIG. 1 is one example of the preferred antireflection film of the present invention. The antireflection film 1 has a layer structure of a transparent support 2, a hard coat layer 3, an antiglare hard coat layer 4 and a low refractive index layer 5 in this order. Fine particles 6 are dispersed in the antiglare hard coat layer 4 and the material in the area exclusive of fine particles 6 in the antiglare layer 4 preferably has a refractive index of 1.57 to 2.00. The lower refractive index layer 5 has a refractive index of 1.35 to 1.49. The hard coat layer 3 is not indispensable, however, is preferably provided so as to impart the film strength. The average reflectance is preferably 1.8 or less.

The transparent support of the antireflection film of the present invention is preferably a plastic film. Examples of the polymer for forming the plastic film include cellulose esters (e.g., triacetyl cellulose, diacetyl cellulose), polyamide, polycarbonate, polyesters (e.g., polyethylene terephthalate, polyethylene naphthalate), polystyrene, polyolefin, ARTON (a trade name, produced by JSR, material name: norbornene-base resin) and ZEONEX (a trade name, produced by Nippon Zeon, material name: amorphous polyolefin). Among these, preferred are triacetyl cellulose, polyethylene terephthalate, polyethylene naphthalate, ARTON and ZEONEX, more preferred is acetyl cellulose.

The protective film used for protecting the polarizing layer of a sheet polarizer of a liquid crystal display device is usually triacetyl cellulose, therefore, use of a triacetyl cellulose film as the transparent support of the antireflection film is advantageous because the antireflection film can be used for the protective film as it is. In this case, the antireflection film can be disposed as the protective film on the outermost surface of a display of a liquid crystal display device, for example, by providing an adhesive layer on one surface of the antireflection film.

Although the thickness of the transparent support for use in the antireflection film of the present invention is not particularly limited, the thickness is preferably from 50 to 150 μm and more preferably from 70 to 120 μm.

The transparent support for use in the antireflection film of the present invention is preferably a triacetyl cellulose film obtained by dissolving triacetyl cellulose in a solvent to prepare a triacetyl cellulose dope and casting the dope by single-layer casting, multi-layer co-casting or multi-layer sequential casting. From the standpoint of environmental conservation, a triacetyl cellulose film manufactured using a triacetyl cellulose dope prepared by dissolving triacetyl cellulose in a solvent substantially free of dichloromethane according to a cooling dissolution method or a high-temperature dissolution method is more preferred.

The single-layer casting of triacetyl cellulose includes drum casting and band casting disclosed in JP-A-7-11055 and the co-casting of triacetyl cellulose comprising a plurality of layers in the latter case is disclosed in JP-A-61-94725 and JP-B-62-43846. The subsequent casting is performed by repeating the single-layer casting. In respective casting operation, the raw material flake is dissolved in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether), and after adding various additives, if desired, such as plasticizer, ultraviolet absorbent, deterioration inhibitor, slipping agent and peeling accelerator, the resulting solution (called a dope) is cast on a support comprising a horizontal endless metal belt or a rotating drum using a dope-supplying means (called a die). At the casting, in the case of single-layer casting, a single dope is cast and in the case of multi-layer casting, a low-concentration dope is co-cast on both sides of a high-concentration cellulose ester dope. Thereafter, the film to which rigidity is imparted as a result of proper drying on the support is peeled off from the support and then passed through a drying zone using a transportation means of various types to remove the solvent.

A representative example of the solvent for dissolving the triacetyl cellulose is dichloromethane. From the technical standpoint, the halogenated hydrocarbon such as dichloromethane may be used without any problem, however, when the transparent support is produced by single-layer casting a triacetyl cellulose dope prepared by dissolving triacetyl cellulose in a solvent substantially containing dichloromethane, the dichloromethane is released into air during the production. Therefore, in view of the environmental conservation or working environment, the solvent preferably contains substantially no halogenated hydrocarbon such as dichloromethane. The term "contains substantially no halogenated hydrocarbon" as used herein means that the ratio of halogenated hydrocarbon in the organic solvent is less than 5% by weight (preferably less than 2% by weight). In the case of co-casting, even when a dope using a solvent substantially containing dichloromethane is cast by multi-layer co-casting, a dope having a higher triacetyl cellulose concentration as compared with the outer cast layer can be used for the cast layer in the inner side and therefore, the amount of dichloromethane released into air can be reduced. The casting rate can be increased and this gives high productivity. Needless to say, even in the case of co-casting, the solvent preferably contains substantially no halogenated hydrocarbon such as dichloromethane.

In the case of preparing a triacetyl cellulose dope using a solvent containing substantially no dichloromethane or the like, special dissolution methods described below must be used.

A first dissolution method called cooling dissolution method is described below. In a solvent, triacetyl cellulose is gradually added while stirring at a temperature in the vicinity of room temperature (−10 to 40° C.). Thereafter, the mixture is cooled to −100 to −10° C. (preferably −80 to −10° C., more preferably −50 to −20° C., most preferably −50 to −30° C.). The cooling may be performed in a dry ice methanol bath (−75° C.) or in a cooled diethylene glycol solution (−30 to −20° C.). As a result of cooling, the mixture of triacetyl cellulose and solvent is solidified. This is then heated to 0 to 200° C. (preferably from 0 to 150° C., more preferably from 0 to 120° C., most preferably from 0 to 50° C.) and turns into a solution where triacetyl cellulose is fluidized in a solvent. The temperature may be elevated by allowing the solidified mixture to stand at room temperature or may be elevated in a warm bath.

A second method called high-temperature dissolution method is described below. In a solvent, triacetyl cellulose is gradually added while stirring at a temperature in the vicinity of room temperature (−10 to 40° C.). The triacetyl cellulose solution for use in the present invention is preferably swelled in advance by adding triacetyl cellulose in a mixed solvent containing various solvents. In this method, the triacetyl cellulose is preferably dissolved to a concentration of 30% by weight or less, however, in view of the drying efficiency at the film formation, the concentration is preferably higher. Thereafter, the organic solvent mixed solution is heated to 70 to 240° C. (preferably at 80 to 220° C., more preferably from 100 to 200° C., most preferably from 100 to 190° C.) under a pressure of 0.2 to 30 MPa. This heated solution cannot be coated as it is and must be cooled to the temperature lower than the lowest boiling point of the solvents used. In this case, the solution is generally cooled to −10 to 50° C. and returned to an atmospheric pressure. The cooling may be performed only by allowing the high-pressure high-temperature container or line having housed therein the triacetyl cellulose solution to stand at room temperature or the equipment may be preferably cooled using a cooling medium such as cooling water.

The antireflection film of the present invention has a low refractive index layer on the transparent support and if desired, a smooth hard coat layer may be provided as an under layer of the low refractive index layer.

The preferred antireflection film of the present invention has an antiglare hard coat layer on the transparent support and further thereon a low refractive index layer and if desired, a smooth hard coat layer may be provided as an under layer of the antiglare hard coat layer.

The antiglare hard coat layer is a non-uniform refractive index layer comprising a binder polymer having dispersed therein particles having an average particle size of 1 to 10 μm. The component exclusive of this particle constituting the antiglare hard coat layer, namely, the binder polymer or a dispersion obtained by dispersing a metal oxide fine particle component having a particle size of 100 nm or less, which is described later, in the binder polymer preferably has a high refractive index of 1.57 to 2.00, more preferably from 1.60 to 1.80. If the refractive index of these components is too small, the antireflection effect decreases, whereas if it is too large, an excessively intensified tint results. JP-A-8-110401 describes the fact that if the high refractive index material comprises a monomer having two or more ethylenically unsaturated groups and a fine particle comprising at least one oxide selected from the group consisting of titanium, zirconium, aluminum, indium, zinc, tin and antimony and having a particle size of 100 nm or less, light scattering does not occur because the particle size of the fine particle is sufficiently smaller than the wavelength of light, and the material behaves as an optically uniform substance.

The above-described antiglare hard coat layer undergoes inside light scattering due to the dispersion of particles having a particle size of 1 to 10 μm in the high refractive index component and therefore, the effect of optical interference is not generated in the antiglare hard coat layer. If the high refractive index hard coat layer does not comprise particles having a particle size in that range, optical interference ascribable to the difference in the refractive index between the antiglare hard coat layer and the support takes place, the reflectance greatly fluctuates due to the dependency of the reflectance on the wavelength, as a result, the antireflection effect deteriorates and at the same time, color irregularity is caused.

The binder polymer is preferably a polymer having a saturated hydrocarbon chain or a polyether chain as the main chain, more preferably a polymer having a saturated hydrocarbon chain as the main chain.

The binder polymer also preferably has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

In order to have a high refractive index, the monomer preferably contains in the structure thereof an aromatic ring or at least one atom selected from the group consisting of halogen atoms (exclusive of fluorine), a sulfur atom, a phosphorus atom and a nitrogen atom.

Examples of the monomer having two or more ethylenically unsaturated groups include esters of polyhydric alcohol and (meth)acrylic acid (e.g., ethylene glycol di(meth)acrylate, 1,4-dichlorohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,3,5-cyclohexanetriol triacrylate, polyurethane polyacrylate, polyester polyacrylate), vinyl benzene and derivatives thereof (e.g., 1,4-divinylbenzene, 4-vinylbenzoic acid-2-acryloylethyl ester, 1,4-divinylcyclohexanone), vinylsulfone (e.g., divinylsulfone), acrylamide (e.g., methylenebisacrylamide) and methacrylamide.

Specific examples of the high refractive index monomer include bis(4-methacryloylthiophenyl) sulfide, vinyl naphthalene, vinylphenyl sulfide, 4-methacryloxyphenyl-4'-methoxyphenylthioether.

The polymerization of the monomer having ethylenically unsaturated groups may be performed under irradiation of ionizing radiation or under heat in the presence of a light radical polymerization initiator or heat radical polymerization initiator.

Accordingly, the preferred antireflection film can be formed by preparing a coating solution containing a monomer having ethylenically unsaturated groups, fine particles and light or heat radical polymerization initiator, applying the coating solution to a transparent support, and curing the coating solution through a polymerization reaction under ionizing radiation or heat.

The polymer having a polyether as the main chain is preferably a ring-opening polymer of a polyfunctional epoxy compound. The ring-opening polymerization of a polyfunctional epoxy compound can be performed under irradiation of ionizing radiation or under heat in the presence of a photoacid generator or a heat-acid generator.

Accordingly, the preferred antireflection film can be formed by preparing a coating solution of a polyfunctional epoxy compound, fine particles and a photoacid generator or a heat-acid generator, applying the coating solution to a transparent support and curing the coating solution through a polymerization reaction under ionizing radiation or heat.

In place of or in addition to the monomer having two or more ethylenically unsaturated groups, a monomer having a crosslinkable functional group may be used so that the crosslinkable functional group can be introduced into the polymer and by a reaction of this crosslinkable functional group, a crosslinked structure can be introduced into the binder polymer.

Examples of the crosslinkable functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester or a metal alkoxide such as urethane and tetramethoxysilane can be used as a monomer for introducing a crosslinked structure. A functional group which exhibits crosslinking property as a result of the decomposition reaction, such as block isocyanate group, may also be used. In other words, the crosslinkable functional group for use in the present invention may be a group which does not cause a reaction instantly but exhibits reactivity after the decomposition.

The binder polymer having this crosslinkable functional group is coated and then heated, whereby a crosslinked structure can be formed.

The antiglare hard coat layer contains particles, for example, inorganic compound particles or resin particles, preferably having an average particle size of 1 to 10 $\mu$m, more preferably from 1.5 to 7.0 $\mu$m, so as to impart antiglare property and inhibit deterioration of the reflectance or color irregularity due to the interference of the antiglare hard coat layer.

Specific examples of the particle include silica particle, inorganic compound particle such as $TiO_2$ particle, and resin particle such as crosslinked acrylic particle, crosslinked styrene particle, melamine resin particle and benzoguanamine resin particle. Among these, silica particle is preferred.

The shape of the particle may be either true spherical or amorphous.

Furthermore, two or more kinds of different particles may be used in combination.

The particle is incorporated into the antiglare hard coat layer such that the amount of the particles in the formed antiglare hard coat layer is preferably from 10 to 1,000 mg/m$^2$, more preferably from 30 to 100 mg/m$^2$.

In a more preferred embodiment, silica particle is used as the particle and silica particles having a particle size larger than ½ of the layer thickness of the antiglare hard coat layer occupy from 40 to 100% of all silica particles. The particle size distribution of particles is measured by a Coulter counter or by centrifugal precipitation and the measured distribution is calculated into a particle number distribution.

In order to increase the refractive index of the antiglare hard coat layer, the layer preferably contains inorganic fine particles comprising an oxide of at least one metal selected from the group consisting of titanium, zirconium, aluminum, indium, zinc, tin and antimony and having a particle size of 100 nm or less, preferably 50 nm or less, in addition to the above-described particle.

Specific examples of the inorganic fine particle include fine particles of $TiO_2$, $ZrO_2$, $Al_2O_3$, $In_2O_3$, $ZnO$, $SnO_2$, $Sb_2O_3$ and ITO.

The amount of the inorganic fine particle added is preferably from 10 to 90%, more preferably from 20 to 80%, still more preferably from 30 to 60%, based on the entire mass of the antiglare hard coat layer.

This fine particle has a particle size sufficiently smaller than the wavelength of light and therefore, causes no light scattering and a dispersion obtained by dispersing the fine particles in a binder polymer behaves as an optically uniform substance.

As described above, the component exclusive of the particle having an average particle size of 1.0 to 10 μm and constituting the antiglare hard coat layer, namely, the binder polymer or a dispersion obtained by dispersing the metal oxide fine particle component having a particle size of 100 nm or less in the binder polymer preferably has a high refractive index of 1.57 to 2.00, more preferably from 1.60 to 1.80. The component can have a refractive index in this range by appropriately selecting the kinds and amount ratios of the binder polymer and the metal oxide fine particle. The appropriate selection can be easily known by a preliminary experimentation.

The thickness of the antiglare hard coat layer is preferably from 1 to 10 μm, more preferably from 1.2 to 6 μm.

In the antireflection film of the present invention, a smooth hard coat layer is provided, if desired, between the transparent support and the low refractive index layer so as to improve the film strength.

Furthermore, in the preferred antireflection film of the present invention, a smooth hard coat layer is provided, if desired, between the transparent support and the antiglare hard coat layer so as to improve the film strength.

The thickness of the smooth hard coat layer is preferably from 1 to 10 μm, more preferably from 1.2 to 6 μm.

The resin for use in the smooth hard coat layer is the same as those described for the antiglare hard coat layer, except that the antiglare property-imparting particle is not used.

The low refractive index layer of the antireflection film of the present invention has a refractive index of 1.35 to 1.49, preferably from 1.35 to 1.44.

Furthermore, from the standpoint of ensuring low reflectance, the low refractive index layer preferably satisfies the following equation (I):

$$m\lambda/4 \times 0.7 < n_1 d_1 < m\lambda/4 \times 1.3 \quad (I)$$

wherein m is a positive odd number, $n_1$ is a refractive index of the low refractive index layer, $d_1$ is a thickness (nm) of the low refractive index layer and λ is a wavelength of 500 to 550 nm.

To satisfy equation (I) means that m (positive odd number, usually 1) satisfying equation (I) is present in the above-described wavelength range.

In the composition for the low refractive index layer of the antireflection film, a hydrolysate of an organosilane and/or a partial condensate thereof, a so-called sol-gel component (hereinafter referred to as such) is used and this component contributes to the improvement in productivity, film strength and scratch resistance.

The sol-gel component undergoes large volume shrinkage at the curing and therefore, may cause reduction in the adhesive property and fail in giving sufficiently high scratch resistance in some cases. In the present invention, inorganic fine particles are added to the composition to reduce the volume shrinkage at the curing and improve the adhesive property, whereby the reduction in the scratch resistance can be prevented. Also, the hardness of the inorganic fine particle can improve the film strength and the scratch resistance.

A fluorine-containing polymer is blended in the composition and this polymer contributes to improve the antifouling property and slipping property of the antireflection film.

The fluorine-containing polymer is preferably a polymer obtained by polymerizing a fluorine-containing vinyl monomer and the polymer more preferably has a functional group capable of covalent bonding with the sol-gel component in view of the compatibility with the sol-gel component and the film strength. The sol-gel component is in the sol state at the stage of the coating solution and is swiftly cured under action of a compound capable of generating a reaction accelerator by light and under light irradiation after the coating.

The sol-gel component for use in the low refractive index layer of the antireflection film is not particularly limited as long as it is a sol-gel component having property such that the sol-gel component is cured under light irradiation. Either a commercially available product or a synthesis product may be preferably used. Preferred examples of the commercially available product include OPSTAR TM505 and TM501A (produced by JSR) which are a photocurable sol-gel component containing a fluorine-containing polymer.

The sol-gel component can be obtained, for example, by hydrolyzing an organosilane represented by the following formula (1) and subsequently condensing the hydrolysate.

$$R_x Si(OR')_{4-x} \quad (1)$$

(wherein R and R', which may be the same or different, each represents hydrogen atom, an alkyl group, an aryl group, an allyl group or a fluoroalkyl group, the alkyl group may have an epoxy group, an amino group, an acryl group, an isocyanate group and/or a mercapto group as a functional group, and x represents an integer of 0 to 3, preferably from 0 to 2).

Specific examples of the organosilane include the followings, however, the present invention is by no means limited thereto.

When x=0:
  tetramethoxysilane, tetraethoxysilane, tetraisopropoxysilane, tetra-n-butoxysilane, etc.

When x=1:
  methyltrimethoxysilane, methyltriethoxysilane, ethyltrimethoxysilane, vinyltrimethoxysilane, vinyltriethoxysilane, phenyltrimethoxysilane, phenyltriethoxysilane, $CF_3CH_2CH_2Si(OCH_3)_3$, $CF_3(CF_2)_5CH_2CH_2Si(OCH_3)_3$,
  γ-glycidoxypropyltrimethoxysilane,
  γ-glycidoxypropyltriethoxysilane,
  γ-aminopropyltrimethoxysilane,
  γ-trimethoxysilylpropylisocyanate,
  γ-mercaptopropyltrimethoxysilane,
  γ-methacryloxypropyltrimethoxysilane,
  γ-acryloxypropyltrimethoxysilane, etc.

When x=2:
  dimethyldimethoxysilane, dimethyldiethoxysilane,
  γ-glycidoxypropylmethyldimethoxysilane,
  γ-aminopropylmethyltriethoxysilane,
  γ-mercaptopropylmethyldimehtoxysilane,
  γ-methacryloxypropylmethyldimethoxysilane, etc.

For the purpose of controlling the hardness or brittleness of the cured film or introducing a functional group, two or more different organosilanes may be used in combination.

The content of the hydrolysate of an organosilane and/or the partial condensate thereof in the low refractive index layer is preferably from 45 to 98.9% and more preferably from 65 to 94.5%, based on the weight of the solid matter in the coating solution of the low refractive index layer.

The hydrolysis/condensation reaction of the organosilane can be performed using no solvent or in the presence of an organic solvent.

Preferred examples of the organic solvent include acetone, methyl ethyl ketone, methyl isobutyl ketone, ethyl acetate, butyl acetate, methanol, ethanol, isopropyl alcohol, butanol, toluene, xylene, tetrahydrofuran and 1,4-dioxane. The organic solvent used here is preferably used as the coating solution as it is and therefore, those capable of dissolving the fluorine-containing polymer are preferred.

The hydrolysis/condensation reaction is preferably performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia: organic bases such as triethylamine and pyridine; metal alkoxides such as triisopropoxy aluminum and tetrabutoxy zirconium; and metal chelate compounds of the above-described metal alkoxide with ethyl acetoacetate or acetylacetone.

The hydrolysis/condensation reaction is performed by adding water in an amount of 0.3 to 2 mol, preferably from 0.5 to 1 mol, per mol of the alkoxy group of the organosilane, and stirring the solution in the presence or absence of a solvent described above and preferably in the presence of a catalyst described above at 25 to 100° C.

The amount of the catalyst used is from 0.01 to 10 mol %, preferably from 0.1 to 5 mol %, based on the alkoxy group.

The reaction conditions are preferably adjusted appropriately according to the reactivity of the organosilane.

In the hydrolysis/condensation reaction, the alkoxy group of the organosilane reacts with water and thereby the alkoxy group is hydrolyzed, as a result, a silanol group is generated. Subsequently, two silanol groups are dehydration condensed to form a siloxane bond. Accordingly, an unreacted alkoxy group, a silanol group and a siloxane bond are present by mixture in this reaction product, though the amount ratio among these varies depending on the amount of water added and other reaction conditions.

The partial condensate of organosilane as used in the present invention means a reaction product where not all alkoxy groups of the organosilane participate in the formation of a silanol bond through a silanol group but a part of the alkoxy groups form a silanol bond and the remaining is not reacted or in the state of a silanol group.

The thus-obtained sol-gel component exhibits photocurability because slight cleavage of bonding is caused by light.

Examples of the fluorine-containing polymer for use in the low refractive index layer of the present invention include fluorine-containing vinyl polymers, fluorine-containing polyethers and fluorine-containing polysiloxanes. Among these, fluorine-containing vinyl polymers are preferred.

The content of the fluorine-containing polymer for use in the low refractive index layer is preferably from 1 to 50% and more preferably from 5 to 30%, based on the weight of the solid matter in the coating solution of the low refractive index layer.

The fluorine-containing vinyl polymer is obtained by radical-polymerizing a fluorine-containing vinyl monomer, Specific examples of the fluorine-containing monomer include fluoroolefins (e.g., fluoroethylene, vinylidene fluoride, tetrafluoroethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Yuki Kagaku), M-2020 (produced by Daikin)), and completely or partially fluorinated vinyl ethers. Among these, preferred are hexafluoropropylene and fluorinated vinyl ethers.

The fluorine-containing vinyl polymer has a reactive group and the reactive group is more preferably a group capable of reacting with the sol-gel component to form a covalent bond, so that the cured film of the sol-gel component can covalently bond with the fluorine-containing polymer component in the low refractive index layer and thereby advantageous results such as improvement in the film strength and transparency can be obtained.

The fluorine-containing vinyl polymer having this reactive group can be obtained by copolymerizing a fluorine-containing vinyl monomer and a vinyl monomer having a reactive group.

The vinyl monomer having a reactive group capable of covalent bonding with the sol-gel component is described below.

Preferred examples of the reactive group capable of reacting with the silanol group generated upon hydrolysis of the organosilane include an alkoxysilyl group. Examples of the alkoxysilyl group-containing vinyl monomer include γ-methacryloxypropyltrimethoxysilane and vinyltrimethoxysilane.

Furthermore, by the hydrolysis/condensation reaction of the organosilane having a functional group, an epoxy group, an amino group, an isocyanate group or a mercapto group can be introduced into the sol-gel component.

Examples of the reactive group capable of covalent bonding with this functional group include a hydroxy group, an epoxy group and a carboxyl group. Examples of the vinyl monomer having this reactive group include the following monomers, however, the present invention is by no means limited thereto.

(1) Monomer Having Hydroxy Group:
   2-hydroxyethyl methacrylate, 2-hydroxyethyl acrylate, 2-hydroxyethyl vinyl ether, 3-hydroxypropyl vinyl ether, 4-hydroxybutyl vinyl ether
(2) Monomer Having Epoxy Group:
   glycidyl methacrylate, glycidyl acrylate, vinyl glycidyl ether
(3) Monomer Having Carboxyl Group:
   acrylic acid, methacrylic acid, β-carboxyethyl acrylate, crotonic acid, itaconic acid, α-vinylacetic acid, vinyl fumarate, vinyl maleate In the copolymerization, a vinyl monomer other than these vinyl monomers may also be used as a copolymerization monomer. Examples of such a monomer include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether, ethyl vinyl ether, n-propyl vinyl ether, n-butyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives. Among these, preferred are vinyl ethers.

The ratio of each monomer used in the copolymerization is such that the fluorine-containing vinyl monomer is from 20 to 80% by mass, the reactive group-containing monomer is from 0 to 30% by mass, preferably from 5 to 25% by mass, and the other monomer is from 0 to 70% by mass, preferably from 10 to 50% by mass. The copolymerization of the monomer can be performed by a radical polymerization which itself is known.

In addition to the method of incorporating a reactive group into the fluorine-containing vinyl polymer by a copolymerization reaction, an alkoxysilyl group can be introduced into the fluorine-containing vinyl polymer by reacting an organosilane having a functional group capable of reacting with the reactive group of the fluorine-containing vinyl polymer and thereby forming a covalent bond. This method of introducing an alkoxysilyl group can be performed in a coating solution having a composition for forming the low refractive index layer and therefore, is simple and preferred.

The composition for forming the low refractive index layer contains a compound which generates a curing reaction accelerator upon irradiation of light, so as to accelerate the curing of the sol-gel component used in the low refractive index layer of the antireflection film. Specifically, the compound is preferably a photoacid generator or a photobase generator and either compound can accelerate the condensation reaction of the so-gel component and thereby accelerate the curing.

Specific examples of the photoacid generator include benzoin tosylate, tri(nitrobenzyl) phosphate, diaryl iodonium salt and triaryl sulfonium salt.

Specific examples of the photo-base generator include nitrobenzylcyclohexyl carbamate and di(methoxybenzyl) hexamethylene dicarbamate.

Among these, preferred are photoacid generator and more preferred are triaryl sulfonium salt and diaryl iodonium salt.

In combination with this compounds, a sensitizing dye may also be preferably used.

The amount blended of the compound capable of generating a curing reaction accelerator upon irradiation of light is from 0.1 to 15% by mass, preferably from 0.5 to 5% by mass, based on the composition (all solids content) for forming the low refractive index layer.

The inorganic fine particle which can be used in the low refractive index layer of the antireflection film is preferably an amorphous particle and preferably comprises an oxide, a nitride or a halide of a metal, more preferably a metal oxide.

Preferred examples of the metal atom include Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni. Among these, Mg, Ca, B and Si are more preferred. An inorganic fine particle comprising two or more kinds of metals may also be used. In particular, the inorganic fine particle is preferably a silicon dioxide fine particle, namely, a silica fine particle.

The average particle size of the inorganic fine particles is preferably from 0.001 to 0.2 $\mu$m, more preferably from 0.005 to 0.05 $\mu$m. The fine particles are preferably uniform in the particle size (monodisperse). If the particle size of the inorganic fine particles is excessively large, an opaque film is formed, whereas if it is too small, the particles are readily coagulated and the synthesis and handling thereof are difficult.

The amount of the inorganic fine particles blended is preferably from 3 to 90% by mass, more preferably from 5 to 70% by mass, still more preferably from 7 to 50% by mass, based on the entire mass of the low refractive index layer. If the amount of the inorganic fine particles blended is too large, the photocurable sol-gel component as a binder cannot form a continuous layer and the film formed is disadvantageous fragile, whereas if it is too small, the effect resultant from the addition of the fine particles is not obtained.

The inorganic fine particle is also preferably subjected to a surface treatment before use. The surface treatment includes a physical surface treatment such as plasma discharge treatment and corona discharge treatment, and a chemical surface treatment using a coupling agent. A chemical surface treatment using a coupling agent is preferred. The coupling agent used is preferably an organoalkoxy metal compound (e.g., titanium coupling agent, silane coupling agent). In the case where the inorganic fine particle is silica, a treatment with a silane coupling agent is particularly effective.

The silane coupling agent which can be used includes the organosilane compound represented by formula (1).

The thickness of the low refractive index layer of the antireflection film is preferably from 0.05 to 0.2 $\mu$m, more preferably from 0.08 to 0.12 $\mu$m.

The low refractive index layer can have a refractive index in the above-described range and satisfy equation (I) by appropriately selecting the kind and amount ratio of each component constituting the low refractive index layer. The kind and amount ratio of each component can be easily known by a preliminary experimentation.

Each layer of the antireflection film can be formed by the coating using dip coating, air knife coating, curtain coating, roller coating, wire bar coating, gravure coating or extrusion coating (see, U.S. Pat. No. 2,681,294). Two or more layers may also be coated at the same time. The simultaneous coating method is described in U.S. Pat. Nos. 2,761,791, 2,941,898, 3,508,947 and 3,526,528, and Yuji Harasaki, *Coating Kogaku* (*Coating Engineering*), page 253, Asakura Shoten (1973).

The preferred antireflection film can be formed by the following method, however, the present invention is not limited to this method.

Coating solutions containing the components for forming respective layers are prepared. A coating solution for forming the antiglare hard coat layer is coated on a transparent support by the above-described coating method, heated and then dried. Thereafter, by the light irradiation or heating, the monomer for forming the antiglare hard coat layer is polymerized and thereby cured. By this, the antiglare hard coat layer is formed.

Next, a coating solution for forming the low refractive index layer is similarly coated on the antiglare hard coat layer, heated and dried, and by the light irradiation, the sol-gel component is cured, whereby the low refractive index layer is formed. After the light irradiation, the coating may be heated, if desired. As such, the preferred antireflection film of the present invention is obtained.

The thus-formed preferred antireflection film of the present invention has a haze value of preferably from 3 to 20%, more preferably from 4 to 15%, and an average reflectance between 450 and 650 nm of preferably 1.8% or less, more preferably 1.5% or less.

The antireflection film of the present invention has a haze value and an average reflectance within these ranges, whereby good antiglare property and high antireflection can be obtained without causing any deterioration of the transmitted image.

The sheet polarizer of the present invention comprises a polarizing layer interposed between two sheets of protective film and uses the above-described antireflection film for at least one sheet of protective film. By using the antireflection film of the present invention as the outermost surface layer, the sheet polarizer obtained can be prevented from reflection of the outer light and favored with high scratch resistance and excellent antifouling property. In the sheet polarizer of the present invention, the antireflection film simultaneously serves as the protective film, so that the production cost can be reduced.

The antireflection film of the present invention can be applied to image display devices such as liquid crystal display device (LCD), plasma display panel (PDP), electroluminescence display (ELD) and cathode ray tube display device (CRT). Furthermore, the antireflection film of the present invention has a transparent support and therefore, is used by adhering the transparent support side to the image display surface of an image display device The present invention is described in greater detail below by referring to the Examples, however, the present invention should not be construed as being limited thereto.

(Preparation of Coating Solution A for Antiglare Hard Coat Layer)

In 439 g of a mixed solvent of methyl ethyl ketone/cyclohexanone (50/50%), 250 g of a mixture of dipentaerythritol pentaacrylate and dipentaerythritol hexaacrylate (DPHA, produced by Nippon Kayaku) was dissolved. To the obtained solution, a solution prepared by dissolving 7.5 g of a photopolymerization initiator (Irgacure 907, produced by Ciba Geigy) and 5.0 g of a photosensitizer (Kayacure DETX, produced by Nippon Kayaku) in 49 g of methyl ethyl ketone was added. The coating obtained after this solution was coated and cured with an ultraviolet ray had a refractive index of 1.53.

To the solution prepared above, 10 g of amorphous silica particles having an average particle size of 3 $\mu$m (Mizukasil P-526, trade name, produced by Mizusawa Kagaku Kogyo K. K.) were added and dispersed with stirring in a high-speed disperser at 5,000 rpm for 1 hour. The obtained dispersion was filtered through a polypropylene-made filter having a pore size of 30 $\mu$m to prepare a coating solution for the antiglare hard coat layer.

(Preparation of Coating Solution B for Antiglare Hard Coat Layer)

In 439 g of a mixed solvent of methyl ethyl ketone/cyclohexanone (50/50%), 125 g of a mixture of dipentaerythritol pentaacrylate and dipentaerythritol hexaacrylate (DPHA, produced by Nippon Kayaku), and 125 g of bis(4-methacyloylthiophenyl) sulfide (MPSMA, produced by Sumitomo Seika K.K.) were dissolved. To the obtained solution, a solution prepared by dissolving 5.0 g of a photopolymerization initiator (Irgacure 907, produced by Ciba Geigy) and 3.0 g of a photosensitizer (Kayacure DETX, produced by Nippon Kayaku) in 49 g of methyl ethyl ketone was added. The coating obtained after this solution was coated and cured with an ultraviolet ray had a refractive index of 1.60.

To the solution prepared above, 10 g of crosslinked polystyrene particles having an average particle size of 2 $\mu$m (SX-200H, trade name, produced by Soken Kagaku K.K.) were added and dispersed with stirring in a high-speed disperser at 5,000 rpm for 1 hour. The obtained dispersion was filtered through a polypropylene-made filter having a pore size of 30 $\mu$m to prepare a coating solution for the antiglare hard coat layer.

(Preparation of Coating Solution C for Antiglare Hard Coat Layer)

To a mixed solvent containing 104.1 g of cyclohexanone and 61.3 g of methyl ethyl ketone, 217.0 g of a zirconium oxide dispersion-containing hard coat coating solution (KZ-7991, produced by JSR) was added while stirring by an air disperser. The coating obtained after this solution was coated and cured with an ultraviolet ray had a refractive index of 1.70.

To the solution prepared above, 5 g of crosslinked polystyrene particles having an average particle size of 2 $\mu$m (SX-200H, trade name, produced by Soken Kagaku K.K.) were added and dispersed with stirring in a high-speed disperser at 5,000 rpm for 1 hour. The obtained dispersion was filtered through a polypropylene-made filter having a pore size of 30 $\mu$m to prepare a coating solution for the antiglare hard coat layer.

(Preparation of Coating Solution D for Antiglare Hard Coat Layer)

To 32.2 g of cyclohexanone, 303.3 g of a zirconium oxide dispersion-containing hard coat coating solution (KZ-7118, produced by JSR) and 123.4 g of a mixture of dipentaerythritol pentaacrylate and dipentaerythritol hexaacrylate (DPHA, produced by Nippon Kayaku) were added while stirring by an air disperser. The coating obtained after this solution was coated and cured with an ultraviolet ray had a refractive index of 1.61.

To the solution prepared above, 8.2 g of crosslinked polystyrene particles having an average particle size of 2 $\mu$m (SX-200H, trade name, produced by Soken Kagaku K.K.) were added and dispersed with stirring in a high-speed disperser at 5,000 rpm for 1 hour. The obtained dispersion was filtered through a polypropylene-made filter having a pore size of 30 $\mu$m to prepare a coating solution for the antiglare hard coat layer.

(Preparation of Coating Solution E for Hard Coat Layer)

In a 439 g of mixed solvent of methyl ethyl ketone/cyclohexanone (50/50%), 250 g of a mixture of dipentaerythritol pentaacrylate and dipentaerythritol hexaacrylate (DPHA, produced by Nippon Kayaku) was dissolved. To the obtained solution, a solution prepared by dissolving 7.5 g of a photopolymerization initiator (Irgacure 907, produced by Ciba Geigy) and 5.0 g of a photosensitizer (Kayacure DETX, produced by Nippon Kayaku) in 49 g of methyl ethyl ketone was added. The coating obtained after this solution was coated and cured with an ultraviolet ray had a refractive index of 1.53.

The solution prepared above was further filtered through a polypropylene-made filter having a pore size of 30 $\mu$m to prepare a coating solution for the hard coat layer.

(Preparation of Coating Solution A for Low Refractive Index Layer)

To 28 g of a photocurable sol-gel compound containing a fluorine-containing polymer having a refractive index of 1.41 and a compound capable of generating a reaction accelerator by light (Opstar TM501A, solid concentration: 15%, produced by JSR), 72 g of methyl isobutyl ketone was added and after stirring, the obtained solution was filtered through a polypropylene-made filter having a pore size of 1 $\mu$m to prepare a coating solution for the low refractive index layer.

(Preparation of Coating Solution B for Low Refractive Index Layer)

To 28 g of a photocurable sol-gel compound containing a fluorine-containing polymer having a refractive index of 1.43 and a compound capable of generating a reaction accelerator by light (Opstar TM505, solid concentration: 15%, produced by JSR), 72 g of methyl isobutyl ketone was added and after stirring, the obtained solution was filtered through a polypropylene-made filter having a pore size of 1 $\mu$m to prepare a coating solution for the low refractive index layer.

(Preparation of Coating Solution C for Low Refractive Index Layer)

To 28 g of a heat crosslinkable fluorine-containing polymer having a refractive index of 1.40 (JN-7223, solid concentration: 6%, produced by JSR), 12 g of methyl isobutyl ketone was added and after stirring, the obtained solution was filtered through a polypropylene-made filter having a pore size of 1 $\mu$m to prepare a coating solution for the low refractive index layer.

(Preparation of Coating Solution D for Low Refractive Index Layer)

To 28 g of a hydrolysis partial condensate having a refractive index of 1.45 of tetraethoxysilane/methyltrimethoxysilane/γ-glycidoxypropyltrimethoxysilane (40/40/20%) (solid concentration: 15%), 0.084 g of a photoacid generator (Cyracure UVI-6990, solid content: 50%) and 72 g of methyl isobutyl ketone were added and after stirring, the obtained solution was filtered through a polypropylene-made filter having a pore size of 1 μm to prepare a coating solution for the low refractive index layer.

(Preparation of Coating Solution E for Low Refractive Index Layer)

To 50 g of a photocurable sol-gel compound containing a fluorine-containing polymer having a refractive index of 1.41 and a compound capable of generating a reaction accelerator by light (Opstar TM501A, solid concentration: 15%, produced by JSR), 2.8 g of a silica particle methyl isobutyl ketone dispersion (MIBK-ST, solid concentration: 30%, produced by Nissan Chemical) and 147 g of methyl isobutyl ketone were added and after stirring, the obtained solution was filtered through a polypropylene-made filter having a pore size of 1 μm to prepare a coating solution for the low refractive index layer.

(Preparation of Coating Solution F for Low Refractive Index Layer)

To 50 g of a photocurable sol-gel compound containing a fluorine-containing polymer having a refractive index of 1.43 and a compound capable of generating a reaction accelerator by light (Opstar TM505, solid concentration: 15%, produced by JSR), 2.8 g of a silica particle methyl isobutyl ketone dispersion (MIBK-ST, solid concentration: 30%, produced by Nissan Chemical) and 147 g of methyl isobutyl ketone were added and after stirring, the obtained solution was filtered through a polypropylene-made filter having a pore size of 1 μm to prepare a coating solution for the low refractive index layer.

(Preparation of Coating Solution G for Low Refractive Index Layer)

To 2.8 g of a silica particle methyl isobutyl ketone dispersion (MIBK-ST, solid concentration: 30%, produced by Nissan Chemical), 0.0084 g of γ-glycidoxypropyl trimethoxysilane was added. The resulting solution was stirred at room temperature for 2 hours and left standing for 24 hours to prepare a surface treated silica dispersion. To this surface-treated silica dispersion, 50 g of a photocurable sol-gel compound containing a fluorine-containing polymer having a refractive index of 1.43 and a compound capable of generating a reaction accelerator by light (Opstar TM505, solid concentration: 15%, produced by JSR) and 147 g of methyl isobutyl ketone were added and after stirring, the obtained solution was filtered through a polypropylene-made filter having a pore size of 1 μm to prepare a coating solution for the low refractive index layer.

(Preparation of Coating Solution H for Low Refractive Index Layer)

To 25.2 g of a hydrolysis partial condensate having a refractive index of 1.45 of tetraethoxysilane/methyltrimethoxysilane/γ-glycidoxypropyltrimethoxysilane (40/40/20%) (solid concentration: 15%), 7 g of a heat crosslinking fluorine-containing polymer (JN-7223, solid concentration: 6%, produced by JSR), 0.084 g of a photoacid generator (Cyracure UVI-6990, solid content: 50%) and 67.8 g of methyl isobutyl ketone were added and after stirring, the obtained solution was filtered through a polypropylene-made filter having a pore size of 1 μm to prepare a coating solution for the low refractive index layer.

(Preparation of Transparent Support)

(1) Preparation of Three-Layer Co-Cast Triacetyl Cellulose Film A (Preparation of Triacetyl Cellulose Dope A1)

Raw materials consisting of 17.4 parts by weight of triacetyl cellulose, 2.6 parts by weight of triphenyl phosphate, 66 parts by weight of dichloromethane, 5.8 parts by weight of methanol and 8.2 parts by weight of n-butanol were mixed and dissolved while stirring to prepare Triacetyl Cellulose Dope A.

(Preparation of Triacetyl Cellulose Dope A2)

Raw materials consisting of 24 parts by weight of triacetyl cellulose, 4 parts by weight of triphenyl phosphate, 66 parts by weight of dichloromethane and 6 parts by weight of methanol were mixed and dissolved while stirring to prepare Triacetyl Cellulose Dope A2.

(Preparation of Three-Layer Co-Cast Triacetyl Cellulose Film A)

According to JP-A-11-254594, a three-layer co-casting die was disposed such that Dope A1 was co-cast on both sides of Dope A2, and the dopes were simultaneously ejected on a metal drum to cast multiple layers. The cast film was peeled off from the drum and dried to obtain a three-layer co-cast triacetyl cellulose film consisting of layers of 10 μm, 60 μm and 10 μm from the drum surface side. In this film, a clear interface was not formed between layers.

(2) Preparation of Triacetyl Cellulose Film B by Low-Temperature Dissolution Method (Preparation of Triacetyl Cellulose Dope B)

A non-uniform gel solution obtained by adding with stirring 20 parts by weight of triacetyl cellulose, 48 parts by weight of methyl acetate, 20 parts by weight of cyclohexanone, 5 parts by weight of methanol, 5 parts by weight of ethanol, 2 parts by weight of triphenyl phosphate/biphenyl diphenyl phosphate (1/2), 0.1 part by weight of silica (particle size: 20 nm) and 0.2 parts by weight of 2,4-bis-(n-octylthio)-6-(4-hydroxy-3,5-di-tert-butylanilino)-1,3,5-triazine, was cooled at −70° C. for 6 hours and then heated with stirring at 50° C. to prepare Dope B.

(Preparation of Triacetyl Cellulose Film B by Low-Temperature Dissolution Method)

According to JP-A-7-11055, Triacetyl Cellulose Dope B prepared above was single-layer cast on a drum to prepare Triacetyl Cellulose Film B having a thickness of 80 μm.

(3) Preparation of Triacetyl Cellulose Film C by High-Temperature Dissolution Method (Preparation of Triacetyl Cellulose Dope C)

A non-uniform gel solution obtained in the same manner as Triacetyl Cellulose Dope B was heated at 180° C. under 1 MPa for 5 minutes in a stainless steel-made closed vessel and then cooled by placing the gel solution with the vessel in a water bath at 50° C. to prepare Triacetyl Cellulose Dope C.

(Preparation of Triacetyl Cellulose Film C by High-Temperature Dissolution Method)

According to JP-A-7-11055, Triacetyl Cellulose Dope C prepared above was single-layer cast on a drum to prepare Triacetyl Cellulose Film C having a thickness of 80 μm.

EXAMPLE 1

Coating Solution A for antiglare hard coat layer prepared above was coated on a 80 μm-thick triacetyl cellulose film (TAC-TD80U, produced by Fuji Photo Film Co., Ltd.) using a bar coater and dried at 120° C. Thereafter, an ultraviolet ray was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form an antiglare hard coat layer having a thickness of 6 μm. Silica particles having a particle size larger than 3 μm corresponding to a half of the thickness of the antiglare hard coat layer accounted for about 50%.

On this antiglare hard coat layer, Coating Solution A for low refractive index layer was coated using a bar coater and dried at 60° C. and thereon an ultraviolet ray was irradiated at an illuminance of 400 mW/cm$^2$ and a dose of 300 mJ/cm$^2$ to cure the coating layer. Thereafter, the coating layer was further heated at 120° C. for 8 minutes to form a low refractive index layer having a thickness of 0.096 μm.

EXAMPLE 2

A sample was prepared in the same manner as in Example 1 except that Coating Solution B for low refractive index layer was coated using a spin coater in place of Coating Solution A for low refractive index layer.

COMPARATIVE EXAMPLE 1

An antiglare hard coat layer was formed in the same manner as in Example 1. On this antiglare hard coat layer, Coating Solution C for low refractive index layer was coated using a bar coater, dried at 80° C. and then heated at 120° C. for 10 minutes to form a low refractive index layer having a thickness of 0.096 μm, thereby preparing a comparative sample.

COMPARATIVE EXAMPLE 2

A comparative sample was prepared in the same manner as in Example 1 except that Coating Solution D for low refractive index layer was used in place of Coating Solution A for low refractive index layer.

EXAMPLE 3

A sample was prepared in the same manner as in Example 1 except that Coating Solution E for low refractive index layer was used in place of Coating Solution A for low refractive index layer.

EXAMPLE 4

A sample was prepared in the same manner as in Example 1 except that Coating Solution F for low refractive index layer was used in place of Coating Solution A for low refractive index layer.

EXAMPLE 5

A sample was prepared in the same manner as in Example 1 except that Coating Solution G for low refractive index layer was used in place of Coating Solution A for low refractive index layer.

EXAMPLE 6

Coating Solution E for hard coat layer was coated on a 80 μm-thick triacetyl cellulose film (TAC-TD80U, produced by Fuji Photo Film Co., Ltd.) using a bar coater and dried at 120° C. Thereafter, an ultraviolet ray was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form a hard coat layer having a thickness of 4 μm.

On the thus-formed hard coat layer, Coating Solution B for antiglare hard coat layer was coated using a bar coater and then, under the same conditions as in the formation of the hard coat layer above, dried and cured with an ultraviolet ray to form a hard coat layer having a thickness of about 1.5 μm.

On this hard coat layer, Coating Solution A for low refractive index layer was coated using a bar coater and dried at 60° C. and thereon an ultraviolet ray was irradiated at an illuminance of 400 mW/cm$^2$ and a dose of 300 mJ/cm$^2$ to cure the coating layer. Thereafter, the coating layer was further heated at 120° C. for 8 minutes to form a low refractive index layer having a thickness of 0.096 μm.

EXAMPLE 7

A sample was prepared in the same manner as in Example 6 except that Coating Solution C for antiglare hard coat layer was used in place of Coating Solution B for antiglare hard coat layer.

EXAMPLE 8

A sample was prepared in the same manner as in Example 6 except that Coating Solution D for antiglare hard coat layer was coated using a gravure coater in place of Coating Solution B for antiglare hard coat layer.

EXAMPLE 9

A sample was prepared in the same manner as in Example 7 except that Coating Solution B for low refractive index layer was used in place of Coating Solution A for low refractive index layer.

COMPARATIVE EXAMPLE 3

An antiglare hard coat layer was formed in the same manner as in Example 7. On this antiglare hard coat layer, Coating Solution C for low refractive index layer was coated using a bar coater, dried at 80° C. and then heated at 120° C. for 10 minutes to form a low refractive index layer having a thickness of 0.096 μm, thereby preparing a comparative sample.

COMPARATIVE EXAMPLE 4

A comparative sample was prepared in the same manner as in Example 7 except that Coating Solution D for low refractive index layer was used in place of Coating Solution A for low refractive index layer.

EXAMPLE 10

A sample was prepared in the same manner as in Example 6 except that Coating Solution E for low refractive index layer was used in place of Coating Solution A for low refractive index layer.

EXAMPLE 11

A sample was prepared in the same manner as in Example 10 except that Coating Solution C for antiglare hard coat layer was used in place of Coating Solution B for antiglare hard coat layer.

EXAMPLE 12

A sample was prepared in the same manner as in Example 10 except that Coating Solution D for antiglare hard coat layer was used in place of Coating Solution B for antiglare hard coat layer.

EXAMPLE 13

A sample was prepared in the same manner as in Example 11 except that Coating Solution F for low refractive index layer was used in place of Coating Solution E for low refractive index layer.

EXAMPLE 14

A sample was prepared in the same manner as in Example 11 except that Coating Solution G for low refractive index layer was used in place of Coating Solution E for low refractive index layer.

EXAMPLE 15

Coating Solution E for hard coat layer was coated on a 80 μm-thick triacetyl cellulose film (TAC-TD80U, produced by Fuji Photo Film Co., Ltd.) using a bar coater and dried at 120° C. Thereafter, an ultraviolet ray was irradiated thereon at an illuminance of 400 mW/cm$^2$ and a dose of 300 mJ/cm$^2$ using an air cooled metal halide lamp of 160 W/cm (manufactured by I-Graphics K.K.) to cure the coating layer and thereby form a hard coat layer having a thickness of 4 μm.

On this hard coat layer, Coating Solution A for low refractive index layer was coated using a bar coater and dried at 60° C. and thereon an ultraviolet ray was irradiated at an illuminance of 400 mW/cm$^2$ and a dose of 300 mJ/cm$^2$ to cure the coating layer. Thereafter, the coating layer was further heated at 120° C. for 8 minutes to form a low refractive index layer having a thickness of 0.096 μm.
(Evaluation of Antireflection Film)

The films obtained were evaluated on the following items.
(1) Average Reflectance A spectral reflectance at an incident angle of 5° in the wavelength region of 380 to 780 nm was measured using an spectrophotometer (manufactured by Nippon Bunko K.K.). An average reflectance in the range from 450 to 650 nm was used as the result.
(2) Haze The haze of each film obtained was measured using a haze meter MODEL 1001DP (manufactured by Nippon Denshoku Kogyo K.K.).
(3) Pencil Hardness Evaluation As an index for scratch resistance, a pencil hardness evaluation described in JIS K 5400 was performed. The antireflection film was subjected to humidity conditioning at a temperature of 25° C. and a humidity of 60% RH for 2 hours, tested under a load of 1 kg using a 3H test pencil prescribed in JIS S6006, and then evaluated according to the following criteria:

⊚: Scratch was not observed at all in the evaluation of n=10.

○: One or two scratches were observed in the evaluation of n=10.

X: Scratches were observed in the evaluation of n=10.
(4) Evaluation of Contact Angle and Finger-Print Attachment As an index for antifouling property on the surface, an optical material subjected to humidity conditioning at a temperature of 25° C. and a humidity of 60% RH for 2 hours was measured on the contact angle to water. Furthermore, a finger print was attached on the surface of this sample and by observing the state after wiping it off with a cleaning cloth, the finger-print attachment was evaluated as follows:

○: The finger print was completely wiped off.

Δ: The finger print was slightly observed.

X: The finger print could be scarcely wiped off.
(5) Measurement of Kinetic Friction Coefficient As an index for surface slippage, the coefficient of kinetic friction was evaluated. The coefficient of kinetic friction used was a value obtained by measuring a sample, after the humidity conditioning at 25° C. and relative humidity of 60% for 2 hours, with a 5 mmφ stainless steel ball under a load of 100 g at a rate of 60 cm/min using a kinetic friction measuring machine HEIDON-14.
(6) Evaluation of Antiglare Property On each antireflection film prepared, an uncovered fluorescent lamp (8,000 cd/m$^2$) without a louver was reflected and the degree of shading of the reflected image was evaluated according to the following criteria:

⊚: The contour of the fluorescent lamp was not recognized at all.

○: The contour of the fluorescent lamp was slightly recognized.

Δ: The fluorescent lamp was not clear and the contour could be recognized.

X: The fluorescent lamp was almost clearly recognized.
(6) Evaluation of Glare

On each antireflection film prepared, diffused light of a fluorescent lamp with a louver was reflected and the glare on the surface was evaluated according to the following criteria:

○: Glare was scarcely recognized.

Δ: Glare was slightly recognized.

X: Glare was recognized with an eye.

The results of Examples and Comparative Examples are shown in Table 1. In any of Examples 1 to 14, excellent antireflection effect is exhibited and with respect to the pencil hardness, finger-print attachment, antiglare property and glare, the capabilities required for the antireflection film all are good.

In Example 15, an antiglare layer is not provided and therefore, antiglare property is not imparted, however, almost no haze, excellent image sharpness and high antireflection effect are verified and also the capabilities required for the antireflection film, such as pencil hardness and finger-print attachment, all are good.

In Comparative Examples 1 and 3, since a sol-gel component is not present in the low refractive index layer, the pencil hardness is low and the scratch resistance is deficient.

In Comparative Examples 2 and 4, since a fluorine-containing polymer is not used, the contact angle is low, the finger-print attachment is not satisfied at all and the antifouling property is deficient.

TABLE 1

|  | Reflectance [%] | Haze [%] | Pencil Hardness (3H) | Contact Angle | Finger-Print Attachment | Coefficient of Kinematic Friction | Antiglare Property | Glare |
|---|---|---|---|---|---|---|---|---|
| Example 1 | 1.7 | 7.3 | ○ | 103 | ○ | 0.08 | ⊚ | ○ |
| Example 2 | 1.8 | 7.2 | ○ | 104 | ○ | 0.07 | ⊚ | ○ |
| Comparative Example 1 | 1.7 | 7.3 | x | 109 | ○ | 0.08 | ⊚ | ○ |

TABLE 1-continued

|  | Reflectance [%] | Haze [%] | Pencil Hardness (3H) | Contact Angle | Finger-Print Attachment | Coefficient of Kinematic Friction | Antiglare Property | Glare |
|---|---|---|---|---|---|---|---|---|
| Comparative Example 2 | 1.9 | 7.2 | ○ | 85 | × | 0.52 | ◎ | ○ |
| Example 3 | 1.7 | 7.3 | ◎ | 101 | ○ | 0.09 | ◎ | ○ |
| Example 4 | 1.8 | 7.2 | ◎ | 101 | ○ | 0.08 | ◎ | ○ |
| Example 5 | 1.8 | 7.2 | ◎ | 100 | ○ | 0.08 | ◎ | ○ |
| Example 6 | 1.2 | 7.1 | ○ | 104 | ○ | 0.07 | ◎ | ○ |
| Example 7 | 1.1 | 7.3 | ○ | 103 | ○ | 0.08 | ◎ | ○ |
| Example 8 | 1.2 | 7.2 | ○ | 104 | ○ | 0.08 | ◎ | ○ |
| Example 9 | 1.2 | 7.3 | ○ | 104 | ○ | 0.07 | ◎ | ○ |
| Comparative Example 3 | 1.0 | 7.1 | × | 108 | ○ | 0.08 | ◎ | ○ |
| Comparative Example 4 | 1.3 | 7.3 | ○ | 82 | × | 0.50 | ◎ | ○ |
| Example 10 | 1.2 | 7.3 | ◎ | 101 | ○ | 0.08 | ◎ | ○ |
| Example 11 | 1.1 | 7.2 | ◎ | 102 | ○ | 0.08 | ◎ | ○ |
| Example 12 | 1.2 | 7.3 | ◎ | 101 | ○ | 0.07 | ◎ | ○ |
| Example 13 | 1.2 | 7.2 | ◎ | 102 | ○ | 0.08 | ◎ | ○ |
| Example 14 | 1.2 | 7.3 | ◎ | 101 | ○ | 0.08 | ◎ | ○ |
| Example 15 | 1.7 | 0.3 | ○ | 103 | ○ | 0.06 | × | ○ |

Using each film of Examples 1 to 14, antiglare antireflection sheet polarizers were prepared. Then, liquid display devices were prepared where an antireflection layer was provided as the outermost layer using each sheet polarizer. As a result, an excellent contrast was obtained because of no reflection of external light, and good visibility was verified without showing the reflected image due to the antiglare property.

Also, using the film of Example 15, an antireflection sheet polarizer was prepared.

Then, a liquid crystal display device was prepared in the same manner as above using this sheet polarizer, as a result, because of no reflection of external light, an excellent contract was obtained and excellent visibility was verified.

EXAMPLE 16

Coating Solution A for antiglare hard coat layer prepared above was coated on Three-Layer Co-Cast Triacetyl Cellulose Film A prepared above using a bar coater and dried at 120° C. Thereafter, an ultraviolet ray was irradiated thereon at an illuminance of 400 mW/cm² and a dose of 300 mJ/cm² using an air cooled metal halide lamp of 160 W/cm (manufactured by I-Graphics K.K.) to cure the coating layer and thereby form an antiglare hard coat layer having a thickness of 6 μm. Silica particles having a particle size larger than 3 μm corresponding to a half of the thickness of the antiglare hard coat layer accounted for about 50%.

On this antiglare hard coat layer, Coating Solution A for low refractive index layer prepared above was coated using a bar coater and dried at 60° C. and thereon an ultraviolet ray was irradiated at an illuminance of 400 mW/cm² and a dose of 300 mJ/cm² to cure the coating layer. Thereafter, the coating layer was further heated at 120° C. for 8 minutes to form a low refractive index layer having a thickness of 0.096 μm.

EXAMPLE 17

A sample was prepared in the same manner as in Example 16 except that Coating Solution B for low refractive index layer was coated using a spin coater in place of Coating Solution A for low refractive index layer.

COMPARATIVE EXAMPLE 5

An antiglare hard coat layer was formed in the same manner as in Example 16. On this antiglare hard coat layer, Coating Solution C for low refractive index layer was coated using a bar coater, dried at 80° C. and then heated at 120° C. for 10 minutes to form a low refractive index layer having a thickness of 0.096 μm, thereby preparing a comparative sample.

COMPARATIVE EXAMPLE 6

A comparative sample was prepared in the same manner as in Example 16 except that Coating Solution D for low refractive index layer was used in place of Coating Solution A for low refractive index layer.

EXAMPLE 18

Coating Solution E for hard coat layer was coated on Three-Layer Co-Cast Triacetyl Cellulose Film A prepared above using a bar coater and dried at 120° C. Thereafter, an ultraviolet ray was irradiated thereon at an illuminance of 400 mW/cm² and a dose of 300 mJ/cm² using an air cooled metal halide lamp of 160 W/cm (manufactured by I-Graphics K.K.) to cure the coating layer and thereby form a hard coat layer having a thickness of 4 μm.

On the thus-formed hard coat layer, Coating Solution B for antiglare hard coat layer was coated using a bar coater and then, under the same conditions as in the formation of the hard coat layer above, dried and cured with an ultraviolet ray to form a hard coat layer having a thickness of about 1.5 μm.

On this hard coat layer, Coating Solution A for low refractive index layer prepared above was coated using a bar coater and dried at 60° C. and thereon an ultraviolet ray was irradiated at an illuminance of 400 mW/cm² and a dose of 300 mJ/cm² to cure the coating layer. Thereafter, the coating layer was further heated at 120° C. for 8 minutes to form a low refractive index layer having a thickness of 0.096 μm.

EXAMPLE 19

A sample was prepared in the same manner as in Example 18 except that Coating Solution C for antiglare hard coat layer was used in place of Coating Solution B for antiglare hard coat layer.

EXAMPLE 20

A sample was prepared in the same manner as in Example 18 except that Coating Solution D for antiglare hard coat layer was coated using a gravure coater in place of Coating Solution B for antiglare hard coat layer.

EXAMPLE 21

A sample was prepared in the same manner as in Example 19 except that Coating Solution B for low refractive index layer was used in place of Coating Solution A for low refractive index layer.

EXAMPLE 22

A sample was prepared in the same manner as in Example 21 except that the transparent support was changed to Triacetyl Cellulose Film B obtained by the low-temperature dissolution method.

EXAMPLE 23

A sample was prepared in the same manner as in Example 21 except that the transparent support was changed to Triacetyl Cellulose Film C obtained by the high-temperature dissolution method.

COMPARATIVE EXAMPLE 7

An antiglare hard coat layer was formed in the same manner as in Example 19. On this antiglare hard coat layer, Coating Solution C for low refractive index layer was coated using a bar coater, dried at 80° C. and then heated at 120° C. for 10 minutes to form a low refractive index layer having a thickness of 0.096 μm, thereby preparing a comparative sample.

COMPARATIVE EXAMPLE 8

A comparative sample was prepared in the same manner as in Example 19 except that Coating Solution D for low refractive index layer was used in place of Coating Solution A for low refractive index layer.

EXAMPLE 24

Coating Solution E for hard coat layer was coated on a Three-Layer Co-Cast Triacetyl Cellulose Film A prepared above using a bar coater and dried at 120° C. Thereafter, an ultraviolet ray was irradiated thereon at an illuminance of 400 mW/cm² and a dose of 300 mJ/cm² using an air cooled metal halide lamp of 160 W/cm (manufactured by I-Graphics K.K.) to cure the coating layer and thereby form a hard coat layer having a thickness of 4 μm.

On this hard coat layer, Coating Solution A for low refractive index layer was coated using a bar coater and dried at 60° C. and thereon an ultraviolet ray was irradiated at an illuminance of 400 mW/cm² and a dose of 300 mJ/cm² to cure the coating layer. Thereafter, the coating layer was further heated at 120° C. for 8 minutes to form a low refractive index layer having a thickness of 0.096 μm.

EXAMPLE 25

A sample was prepared in the same manner as in Example 19 except that Coating Solution H for low refractive index layer was used in place of Coating Solution A for low refractive index layer.

TABLE 2

| | Transparent Support | Coating Solution for Hard Coat Layer | Coating Solution for Antiglare Hard Coat Layer | Coating Solution for Low Refractive Index Layer |
|---|---|---|---|---|
| Example 16 | triacetyl cellulose film A | none | A | A |
| Example 17 | triacetyl cellulose film A | none | A | B |
| Example 18 | triacetyl cellulose film A | E | B | A |
| Example 19 | triacetyl cellulose film A | E | C | A |
| Example 20 | triacetyl cellulose film A | E | D | A |
| Example 21 | triacetyl cellulose film A | E | C | B |
| Example 22 | triacetyl cellulose film B | E | C | B |
| Example 23 | triacetyl cellulose film C | E | C | B |
| Example 24 | triacetyl cellulose film A | E | none | A |
| Example 25 | triacetyl cellulose film A | E | C | H |
| Comparative Example 5 | triacetyl cellulose film A | none | A | C |
| Comparative Example 6 | triacetyl cellulose film A | none | A | D |
| Comparative Example 7 | triacetyl cellulose film A | E | C | C |
| Comparative Example 8 | triacetyl cellulose film A | E | C | D |

Evaluation on the above-described items was performed in the same manner and the results are shown in Table 3.

TABLE 3

| | Reflectance [%] | Haze [%] | Pencil Hardness (3H) | Contact Angle [°] | Finger-Print Attachment | Coefficient of Kinematic Friction | Antiglare Property | Glare |
|---|---|---|---|---|---|---|---|---|
| Example 16 | 1.7 | 7.3 | ○ | 103 | ○ | 0.08 | ◉ | ○ |
| Example 17 | 1.8 | 7.2 | ○ | 104 | ○ | 0.07 | ◉ | ○ |
| Example 18 | 1.2 | 7.1 | ○ | 104 | ○ | 0.07 | ◉ | ○ |
| Example 19 | 1.1 | 7.3 | ○ | 103 | ○ | 0.08 | ◉ | ○ |
| Example 20 | 1.2 | 7.2 | ○ | 104 | ○ | 0.08 | ◉ | ○ |

TABLE 3-continued

|  | Reflectance [%] | Haze [%] | Pencil Hardness (3H) | Contact Angle [°] | Finger-Print Attachment | Coefficient of Kinematic Friction | Antiglare Property | Glare |
|---|---|---|---|---|---|---|---|---|
| Example 21 | 1.2 | 7.3 | ◯ | 104 | ◯ | 0.07 | ⊚ | ◯ |
| Example 22 | 1.1 | 7.3 | ◯ | 103 | ◯ | 0.08 | ⊚ | ◯ |
| Example 23 | 1.1 | 7.3 | ◯ | 103 | ◯ | 0.08 | ⊚ | ◯ |
| Example 24 | 1.7 | 0.3 | ◯ | 103 | ◯ | 0.06 | — | ◯ |
| Example 25 | 1.3 | 7.3 | ◯ | 104 | ◯ | 0.07 | ⊚ | ◯ |
| Comparative Example 5 | 1.7 | 7.3 | × | 109 | ◯ | 0.08 | ⊚ | ◯ |
| Comparative Example 6 | 1.9 | 7.2 | ◯ | 85 | × | 0.52 | ⊚ | ◯ |
| Comparative Example 7 | 1.0 | 7.1 | × | 108 | ◯ | 0.08 | ⊚ | ◯ |
| Comparative Example 8 | 1.3 | 7.3 | ◯ | 82 | × | 0.50 | ⊚ | ◯ |

In any of Examples 16 to 23 and 25, excellent antireflection performance is exhibited and with respect to the pencil hardness, finger-print attachment, antiglare property and glare, the capabilities required for the antireflection film all are good.

In Example 24, an antiglare layer is not provided and therefore, antiglare property is not imparted, however, almost no haze, excellent image sharpness and high antireflection performance are verified and also the capabilities required for the antireflection film, such as pencil hardness and finger-print attachment, all are good.

In Comparative Examples 5 and 7, since a sol-gel component is not present in the low refractive index layer, the pencil hardness is low and the scratch resistance is deficient.

In Comparative Examples 6 and 8, since a fluorine-containing polymer component is not used, the contact angle is low, the finger-print attachment is not satisfied at all and the antifouling property is deficient.

Using each film of Examples 16 to 23 and 25, antiglare antireflection sheet polarizers were prepared. Then, liquid display devices were prepared where an antireflection layer was provided as the outermost layer using each sheet polarizer. As a result, an excellent contrast was obtained because of no reflection of external light, and good visibility was verified without showing the reflected image due to the antiglare property.

Also, using the film of Example 24, an antireflection sheet polarizer was prepared. Then, a liquid crystal display device was prepared in the same manner as above using this sheet polarizer, as a result, because of no reflection of external light, an excellent contract was obtained and excellent visibility was verified.

The antireflection film of the present invention has high antireflection performance, good antifouling property and excellent scratch resistance and can be produced at a low cost by forming an antiglare hard coat layer and a low refractive index layer. The sheet polarizer and the liquid crystal display device each using this antireflection film are favored with excellent properties in that the reflection of external light is satisfactorily prevented and the resistance against fouling and scratching is high.

While the invention has been described in detail and with reference to specific embodiments thereof, it will be apparent to one skilled in the art that various changes and modifications can be made therein without departing from the spirit and scope thereof.

What is claimed is:

1. An antireflection film comprising a transparent support and a low refractive index layer having a refractive index of 1.35 to 1.49, wherein the low refractive index layer contains a hydrolysate of an organosilane or a partial condensate thereof, a compound capable of generating a reaction accelerator under light, and a fluorine-containing polymer, wherein the low refractive index layer is arranged above the transparent supporting, and
   wherein an antiglare hard coat layer comprising particles having an average particle size of 1 to 10 µm is provided between the transparent support and the low refractive index layer, the haze value of the film is from 3 to 20%, and the average reflectance of the film in the range from 450 to 650 nm is 1.8% or less.

2. The antireflection film as claimed in claim 1, wherein when particles having an average particle size of 1 to 10 µm are removed from the composition for forming the antiglare hard coat layer and a film is formed of the composition, the film has a refractive index of 1.57 to 2.00.

3. The antireflection film as claimed in claim 1, wherein in the low refractive index layer, the compound capable of generating a reaction accelerator under light is a photoacid generator.

4. The antireflection film as claimed in claim 1, wherein in the low refractive index layer, the fluorine-containing polymer is a polymer obtained by polymerizing a fluorine-containing vinyl monomer.

5. The antireflection film as claimed in claim 4, wherein the fluorine-containing polymer has a functional group capable of covalently bonding with the organosilane.

6. The antireflection film as claimed in claim 1, wherein the composition for forming the low refractive index layer contains inorganic fine particles having an average particle size of 0.001 to 0.2 4 µm.

7. The antireflection film as claimed in claim 6, wherein the inorganic fine particles contained in the composition for forming the low refractive index layer are silica particles.

8. The antireflection film as claimed in claim 7, wherein the silica particles are treated with a silane coupling agent.

9. The antireflection film as claimed in claim 1, wherein the transparent support is triacetyl cellulose, polyethylene terephthalate or polyethylene naphthalate.

10. A sheet polarizer comprising a polarizing layer sandwiched by two sheets of protective film, at least one of said two sheets of protective film being an antireflection film comprising a transparent support and a low refractive index layer having a refractive index of 1.35 to 1.49, wherein the low refractive index layer contains a hydrolysate of an organosilane or a partial condensate thereof, a compound capable of generating a reaction accelerator under light, and a fluorine-containing polymer, and wherein the low refractive index layer is arranged above the transparent support.

11. A liquid crystal display device using for the outermost layer of the display, an antireflection film comprising a transparent support and a low refractive index layer having a refractive index of 1.35 to 1.49, wherein the low refractive index layer contains a hydrolysate of an organosilane or a partial condensate thereof, a compound capable of generating a reaction accelerator under light, and a fluorine-containing polymer, wherein the low refractive index layer is arranged above the transparent support, or a low refractive index layer of a sheet polarizer comprising a polarizing layer sandwiched by two sheets of protective film with at least one of said two sheets of protective film being said antireflection film.

12. The antireflection film as claimed in claim 1, wherein the antiglare hard coat layer comprises particles having an average particle size of 1.5 to 7.0 $\mu$m.

13. The antireflection film as claimed in claim 1, wherein the fluorine-containing polymer is selected from the group consisting of fluorine-containing vinyl polymers, fluorine-containing polyethers and fluorine-containing polysiloxanes.

14. The antireflection film as claimed in claim 13, wherein the fluorine-containing polymer is selected from the group consisting of fluorine-containing vinyl polymers.

15. The antireflection film as claimed in claim 1, wherein the compound capable of generating a reaction accelerator under light is selected from the group consisting of a photoacid generator and a photo-base generator.

16. An antireflection film comprising a transparent support and a low refractive index layer having a refractive index of 1.35 to 1.49, wherein the low refractive index layer contains a hydrolysate of an organosilane or a partial condensate thereof, a compound capable of generating a reaction accelerator under light, and a fluorine-containing polymer, wherein the low refractive index layer is arranged above the transparent support,     wherein in the low refractive index layer, the fluorine-containing polymer is a polymer obtained by polymerizing a fluorine-containing vinyl monomer, and     wherein the composition for forming the low refractive index layer contains silica particles having an average particle size of 0.001 to 0.2 $\mu$m.

17. An antireflection film comprising a transparent support and a low refractive index layer having a refractive index of 1.35 to 1.49, wherein the low refractive index layer contains a hydrolysate of an organosilane or a partial condensate thereof and a fluorine-containing polymer, wherein the low refractive index layer is formed from a composition comprising a compound capable of generating a reaction accelerator under light, and wherein the low refractive index layer is arranged above the transparent support.

18. An antireflection film comprising a transparent support and a low refractive index layer having a refractive index of 1.35 to 1.49, wherein the low refractive index layer contains a hydrolysate of an organosilane or a partial condensate thereof, a compound capable of generating a reaction accelerator under light, and a photocurable sol-gel component containing a fluorine-containing polymer, and wherein the low refractive index layer is arranged above the transparent support.

* * * * *